(12) United States Patent
Khanna

(10) Patent No.: US 8,421,400 B1
(45) Date of Patent: Apr. 16, 2013

(54) SOLAR-POWERED BATTERY CHARGER AND RELATED SYSTEM AND METHOD

(75) Inventor: Ramesh Khanna, Allen, TX (US)

(73) Assignee: National Semiconductor Corporation, Santa Clara, CA (US)

( * ) Notice: Subject to any disclaimer, the term of this patent is extended or adjusted under 35 U.S.C. 154(b) by 597 days.

(21) Appl. No.: 12/589,984

(22) Filed: Oct. 30, 2009

(51) Int. Cl.
*H02J 7/00* (2006.01)

(52) U.S. Cl.
USPC .......................................................... 320/101

(58) Field of Classification Search .................. 320/101, 320/137, 140, 143, 144; 307/6, 45, 58, 82
See application file for complete search history.

(56) References Cited

U.S. PATENT DOCUMENTS

| | | | |
|---|---|---|---|
| 4,129,788 A | 12/1978 | Chavannes | |
| 4,189,765 A | 2/1980 | Kotalik et al. | |
| 4,280,097 A | 7/1981 | Carey et al. | |
| 4,688,538 A | 8/1987 | Ward et al. | |
| 4,725,740 A | 2/1988 | Nakata | |
| 5,284,719 A | 2/1994 | Landau et al. | |
| 5,307,006 A | 4/1994 | Rankin et al. | |
| 5,408,404 A | 4/1995 | Mitchell | |
| 5,412,308 A | 5/1995 | Brown | |
| 5,528,125 A | 6/1996 | Marshall et al. | |
| 5,600,247 A | 2/1997 | Matthews | |
| 5,604,430 A | 2/1997 | Decker et al. | |
| 5,659,465 A | 8/1997 | Flack et al. | |
| 5,666,040 A | 9/1997 | Bourbeau | |
| 5,669,987 A | 9/1997 | Takehara et al. | |
| 5,747,967 A | 5/1998 | Muljadi et al. | |
| 5,751,120 A | 5/1998 | Zeitler et al. | |
| 5,892,354 A | 4/1999 | Nagao et al. | |
| 6,169,678 B1 | 1/2001 | Kondo et al. | |
| 6,184,656 B1 | 2/2001 | Karunasiri et al. | |
| 6,184,660 B1 * | 2/2001 | Hatular | 320/141 |
| 6,281,485 B1 | 8/2001 | Siri | |
| 6,331,670 B2 | 12/2001 | Takehara et al. | |
| 6,369,576 B1 | 4/2002 | Matthews et al. | |

(Continued)

FOREIGN PATENT DOCUMENTS

| EP | 1 239 573 A1 | 9/2002 |
|---|---|---|
| ES | 2 249 147 B1 | 5/2007 |

(Continued)

OTHER PUBLICATIONS

Office Action dated Dec. 9, 2011 in connection with U.S. Appl. No. 12/454,244.

(Continued)

*Primary Examiner* — Richard V Muralidar
(74) *Attorney, Agent, or Firm* — Andrew S. Viger; Wade J. Brady, III; Frederick J. Telecky, Jr.

(57) ABSTRACT

A solar-powered charger includes a solar panel configured to generate electrical energy at a first voltage level. The charger also includes a converter configured to receive the electrical energy from the solar panel, perform temperature compensation, and output the electrical energy to a load at a second voltage level. The second voltage level could be between 13.2V and 14.4V, inclusive. The converter could be configured to output the electrical energy at the second voltage level with a substantially constant current over temperatures between 0° C. and 100° C., inclusive. The converter could be configured to be coupled to and recharge a lead acid battery, a lithium ion battery, or a nickel metal hydride battery.

15 Claims, 9 Drawing Sheets

Varying s at T = 25° C

U.S. PATENT DOCUMENTS

| | | | |
|---|---|---|---|
| 6,608,404 | B2 | 8/2003 | Schienbein et al. |
| 6,633,823 | B2 | 10/2003 | Bartone et al. |
| 6,636,431 | B2 | 10/2003 | Seki et al. |
| 6,717,519 | B2 | 4/2004 | Kobayashi et al. |
| 6,750,391 | B2 | 6/2004 | Bower et al. |
| 6,844,739 | B2 | 1/2005 | Kasai et al. |
| 6,850,820 | B2 | 2/2005 | Tajima |
| 6,966,184 | B2 | 11/2005 | Toyomura et al. |
| 6,975,522 | B2 | 12/2005 | Asano |
| 6,984,967 | B2 | 1/2006 | Notman |
| 7,046,527 | B2 | 5/2006 | West |
| 7,109,604 | B2 * | 9/2006 | Kablaoui et al. ............ 307/31 |
| 7,477,080 | B1 | 1/2009 | Fest |
| 7,566,828 | B2 | 7/2009 | Sasaki |
| 7,605,498 | B2 | 10/2009 | Ledenev et al. |
| 7,701,083 | B2 | 4/2010 | Savage |
| 7,723,865 | B2 | 5/2010 | Kitanaka |
| 7,759,903 | B2 | 7/2010 | Kamata |
| 7,843,085 | B2 | 11/2010 | Ledenev et al. |
| 7,925,552 | B2 | 4/2011 | Tarbell et al. |
| 2002/0038667 | A1 | 4/2002 | Kondo et al. |
| 2003/0201674 | A1 | 10/2003 | Droppo et al. |
| 2004/0135545 | A1 | 7/2004 | Fowler et al. |
| 2005/0105224 | A1 | 5/2005 | Nishi |
| 2005/0257827 | A1 | 11/2005 | Gaudiana et al. |
| 2006/0017327 | A1 | 1/2006 | Siri et al. |
| 2006/0149607 | A1 | 7/2006 | Sayers et al. |
| 2006/0162772 | A1 | 7/2006 | Presher, Jr. et al. |
| 2006/0171182 | A1 | 8/2006 | Siri et al. |
| 2006/0176036 | A1 | 8/2006 | Flatness et al. |
| 2007/0137688 | A1 | 6/2007 | Yoshida |
| 2007/0164612 | A1 | 7/2007 | Wendt et al. |
| 2008/0013347 | A1 | 1/2008 | Deng et al. |
| 2008/0087321 | A1 | 4/2008 | Schwartzman |
| 2008/0097655 | A1 | 4/2008 | Hadar et al. |
| 2008/0143188 | A1 | 6/2008 | Adest et al. |
| 2008/0147335 | A1 | 6/2008 | Adest et al. |
| 2008/0150366 | A1 | 6/2008 | Adest et al. |
| 2008/0257397 | A1 * | 10/2008 | Glaser et al. ............ 136/244 |
| 2008/0278983 | A1 | 11/2008 | Park |
| 2009/0039852 | A1 | 2/2009 | Fishelov et al. |
| 2009/0140719 | A1 | 6/2009 | Hasenfus |
| 2009/0242011 | A1 | 10/2009 | Proisy et al. |
| 2009/0283128 | A1 | 11/2009 | Zhang et al. |
| 2009/0283129 | A1 | 11/2009 | Foss |
| 2009/0284078 | A1 | 11/2009 | Zhang et al. |
| 2009/0284232 | A1 | 11/2009 | Zhang et al. |
| 2009/0284240 | A1 | 11/2009 | Zhang et al. |
| 2009/0284998 | A1 | 11/2009 | Zhang et al. |
| 2009/0289502 | A1 | 11/2009 | Batarseh et al. |
| 2010/0001587 | A1 | 1/2010 | Casey et al. |
| 2010/0126550 | A1 | 5/2010 | Foss |
| 2010/0269883 | A1 | 10/2010 | Sarhan |
| 2010/0288327 | A1 | 11/2010 | Lisi et al. |
| 2010/0327659 | A1 | 12/2010 | Lisi et al. |

FOREIGN PATENT DOCUMENTS

| | | |
|---|---|---|
| JP | 07-234733 A | 9/1995 |
| JP | 08-123563 A | 5/1996 |
| JP | 08-314555 A | 11/1996 |
| JP | 10014105 A | 1/1998 |
| JP | 10155240 A | 6/1998 |
| JP | 11098679 A | 4/1999 |
| JP | 2000112545 A | 4/2000 |
| JP | 2000116010 A | 4/2000 |
| JP | 2003134661 A | 5/2003 |
| JP | 2003216255 A | 7/2003 |
| JP | 2005-151662 | 6/2005 |
| JP | 2005243852 A | 9/2005 |
| JP | 2005252172 A | 9/2005 |
| JP | 2006134118 A | 5/2006 |
| JP | 2006216660 A | 8/2006 |
| JP | 2006-320149 | 11/2006 |
| JP | 2007-133765 | 5/2007 |
| KR | 100757320 B1 | 9/2007 |
| KR | 20080010116 A | 1/2008 |
| KR | 100886891 B1 | 3/2009 |
| KR | 1020090133036 A | 12/2009 |
| WO | WO 2007/084196 A2 | 7/2007 |

OTHER PUBLICATIONS

Office Action dated Dec. 30, 2011 in connection with U.S. Appl. No. 12/456,776.

Office Action dated Jan. 25, 2012 in connection with U.S. Appl. No. 12/454,136.

Office Action dated Nov. 25, 2011 in connection with U.S. Appl. No. 12/272,990.

"Micropower Synchronous, Buck-Boost DC/DC Converter", MiniLogic Device Corporation, Sep. 2005, p. 1-13.

Geoffrey R. Walker, et al., "Cascaded DC-DC Converter Connection of Photovoltaic Modules", IEEE Transactions on Power Electronics, vol. 19, No. 4, Jul. 2004, p. 1130-1139.

Office Action dated Sep. 21, 2011 in connection with U.S. Appl. No. 12/456,777.

Office Action dated Aug. 30, 2011 in connection with U.S. Appl. No. 12/386,958.

Notification of Transmittal of the International Search Report and the Written Opinion of the International Searching Authority, or the Declaration dated Dec. 31, 2010 in connection with PCT Application No. PCT/US2010/031462.

Notification of Transmittal of the International Search Report and the Written Opinion of the International Searching Authority, or the Declaration dated Jan. 3, 2011 in connection with PCT Application No. PCT/US2010/031505.

Notification of Transmittal of the International Search Report and the Written Opinion of the International Searching Authority, or the Declaration dated Jan. 13, 2011 in connection with PCT Application No. PCT/US2010/034783.

Yunwei Li, et al., "Design, Analysis, and Real-Time Testing of a Controller for Multibus Microgrid System", IEEE Transactions on Power Electronics, vol. 19, No. 5, Sep. 2004, p. 1195-1204.

R.H. Lasseter, "MicroGrids", 2002 IEEE Power Engineering Society Winter Meeting, vol. 1, Jan. 2002, p. 305-308.

John Stevens, "Development of Sources and a Testbed for CERTS Microgrid Testing", 2004 IEEE Power Engineering Society General Meeting, Jun. 2004, p. 1-2.

Mike Barnes, et al., "Real-World MicroGrids—An Overview", 2007 IEEE SoSE International Conference, Apr. 2007, p. 1-8.

Paolo Piagi, et al., "Autonomous Control of Microgrids", IEEE Power Engineering Society General Meeting, Jun. 2006, 8 pages.

Y. Zoka, et al., "An Interaction Problem of Distributed Generators Installed in a MicroGrid", 2004 IEEE International Conference on Electric Utility Deregulation, Restructuring and Power Technologies (DRPT2004), Apr. 2004, Hong Kong, p. 795-799.

M.P.F. Hommelberg, et al., "Distributed Control Concepts using Multi-Agent technology and Automatic Markets: An indispensable feature of smart power grids", 2007 IEEE Power Engineering Society General Meeting, Jun. 2007, p. 1-7.

Notification of Transmittal of the International Search Report and the Written Opinion of the International Searching Authority, or the Declaration dated Dec. 17, 2009 in connection with PCT Application No. PCT/US2009/044033.

Guo Heng, et al., "A Novel Maximum Power Point Tracking Strategy for Stand-along Solar Pumping Systems", 2005 IEEE, 5 pages.

Debosmita Das, et al., "An Optimal Design of a Grid Connected Hybrid Wind/Photovoltaic/Fuel Cell System for Distributed Energy Production", 2005 IEEE, p. 2499-2504.

Claus Bjerge, et al., "How to run an offshore wind farm like a conventional power plant", www.modernpowersystems.com, Jan. 2007, 4 pages.

Steven Anderson, "Remote . . . But Not Economically Out of Reach", Power and Energy, Dec. 15, 1986, 5 pages.

Qihi Liu, et al., "Novel Modeling and Control of Doubly-Fed Variable-Speed Constant-Frequency Wind Power Generator", The 33rd Annual Conference of the IEEE Industrial Electronics Society (IECON), Nov. 5-8, 2007, p. 1621-1626.

Casisheng Wang, "Modeling and Control of Hybrid Wind/Photovoltaic/Fuel Cell Distributed Generation Systems", Jul. 2006, Montana State University, 403 pages.

Notification of Transmittal of the International Search Report and the Written Opinion of the International Searching Authority, or the Declaration dated Dec. 23, 2009 in connection with International Patent Application No. PCT/US2009/044036.

Jianhui Zhang, et al., "Active Cell and Module Balancing for Batteries or Other Power Supplies", U.S. Appl. No. 12/882,781, filed Sep. 15, 2010.

Werner Rößler, "Boost battery performance with active charge-balancing", EE Times-Asia, Jul. 16-31, 2008, p. 1-3.

Andrew Foss, "System and Method for Solar Panel Array Analysis", U.S. Appl. No. 12/386,958, filed Apr. 24, 2009.

Gianpaolo Lisi, et al., "Off-Grid LED Street Lighting System With Multiple Panel-Storage Matching", U.S. Appl. No. 12/925,110, filed Oct. 14, 2010.

Notification of Transmittal of the International Search Report and the Written Opinion of the International Searching Authority, or the Declaration dated Dec. 24, 2009 in connection with International Patent Application No. PCT/US2009/044019.

Carlos Meza, et al., "Boost-Buck inverter variable structure control for grid-connected photovoltaic systems", 2005 IEEE, p. 1318-1321.

Mikihiko Matsui, et al., "A New Maximum Photovoltaic Power Tracking Control Scheme Based on Power Equilibrium at DC Link", 1999 IEEE, p. 804-809.

Notification of Transmittal of the International Search Report and the Written Opinion of the International Searching Authority, or the Declaration dated Dec. 23, 2009 in connection with PCT Application No. PCT/US2009/044027.

Notification of Transmittal of the International Search Report and the Written Opinion of the International Searching Authority, or the Declaration dated Dec. 23, 2009 in connection with PCT Application No. PCT/US2009/044015.

Jianhui Zhang, et al., "Method and System for Providing Central Control in a Energy Generating System", U.S. Appl. No. 12/152,479, filed May 14, 2008.

Stephen W. Moore, et al., "A Review of Cell Equalization Methods for Lithium Ion and Lithium Polymer Battery Systems", Society of Automotive Engineers, Inc., 2001, 5 pages.

Sihua Wen, "Cell balancing buys extra run time and battery life", Analog Applications Journal, 2009, 8 pages.

"Five to Ten Series Cell Lithium-Ion or Lithium-Polymer battery Protector and Analog Front End", Texas Instruments, Jun. 2008, 60 pages.

"Li-Ion, NiMH Battery Measuring, Charge Balancing and Power-supply Circuit", Atmel Corporation, Oct. 2009, 55 pages.

"PV FAQs", U.S. Department on Energy, Jan. 2004, 2 pages.

"Perspectives of Concentrating Solar Power", Renewable Energy India 2008 Expo, Aug. 22, 2008, 16 pages.

"APEC 2008, 23rd Annual Applied Power Electronics Conference and Exposition", vol. 1, Seminars 1-6, Feb. 24-28, 2008, Austin, Texas, 89 pages.

* cited by examiner

SOLAR-POWERED BATTERY CHARGER AND RELATED SYSTEM AND METHOD

TECHNICAL FIELD

This disclosure relates generally to battery charging and, more specifically, to a solar-powered battery charger and related system and method.

BACKGROUND

Photovoltaic panels, also called "solar panels," use radiant light from the sun to generate electrical energy. Solar panels include a number of photovoltaic cells that convert sunlight into electrical energy. When light shines on a photovoltaic cell, a voltage develops across the cell, and current flows through the cell if the cell is connected to a load. The voltage and current can vary based on numerous factors, such as the physical size of the photovoltaic cell, the amount of light shining on the cell, the temperature of the cell, and various other factors.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1A through 7, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1A:
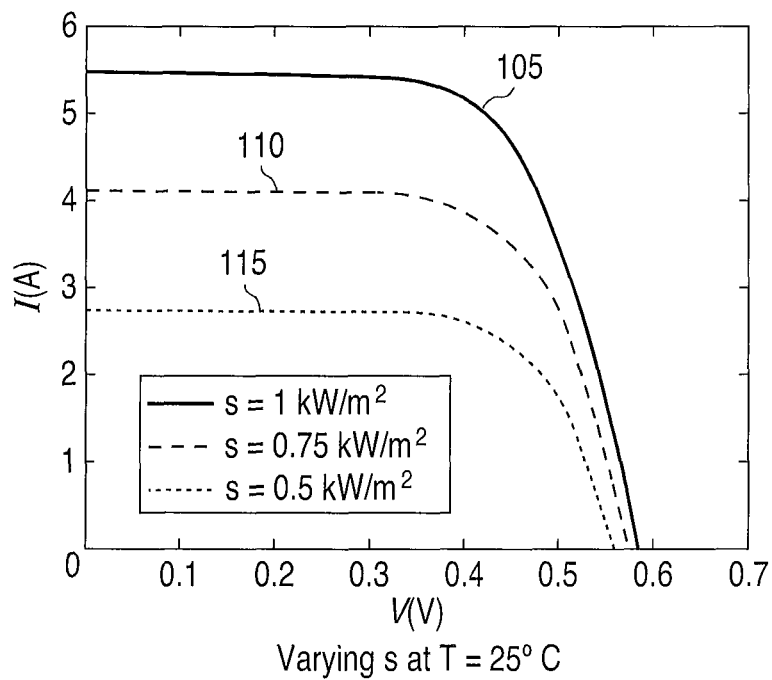
FIGS. 1A and 1B illustrate example current-voltage curves for a solar cell according to this disclosure.
Figure 1B:
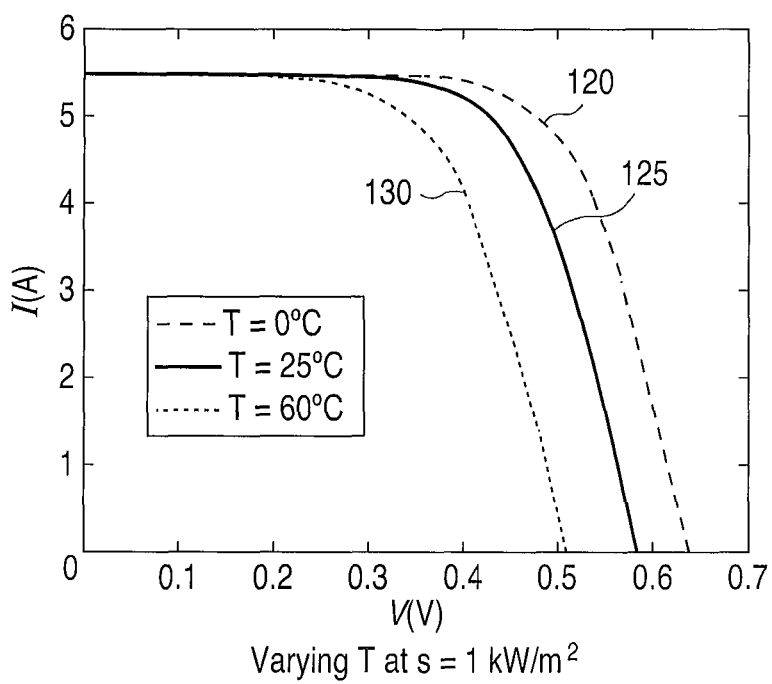

FIGS. 1A and 1B illustrate example current-voltage curves for a solar cell according to this disclosure. A solar panel (also referred to as a photovoltaic or "PV" panel) typically includes a number of solar cells (also referred to as PV cells) arranged in series and/or in parallel. For example, the PV cells could be coupled in series within a group, and a number of groups can be coupled in parallel. Likewise, a solar array (also referred to as a PV array) typically includes a number of solar panels arranged in series and/or in parallel.

An amount of electrical power generated by a solar panel is determined by the solar panel's voltage and current. In a solar array, electrical connections can be made in series to achieve a desired output voltage capability and/or in parallel to provide a desired output current capability. In some cases, each panel's voltage is boosted (increased) or bucked (decreased) with a DC-DC converter. The solar array is typically connected to an electrical load, such as a power storage device like battery cells. The solar panels deliver electrical power to the load.

Solar panels exhibit voltage and current characteristics typically described by their current-voltage (I-V) curves. When a solar panel is not connected to a load, the voltage across its terminals represents its open-circuit voltage $V_{oc}$. When the terminals are connected together to form a short circuit, a short circuit current $I_{sc}$ is generated. Further, a maximum power point (MPP) defines a point where a solar panel is generating a maximum amount of power.

An ideal solar cell can be modeled as a current source connected in parallel with a rectifying diode. The photo-generated current $I_{ph}$ is dependent upon the sunlight impressed upon the solar cell. Accordingly, when no sunlight is present (i.e., when it is dark), the solar cell appears as a diode. Since a solar panel can include a number of solar cells coupled in series, if one solar cell is shaded, then its current generation and current carrying capability is limited as a result of the shading or lack of sunlight. Further, the limited capability of the solar cell can limit current capability of the entire solar panel.

FIG. 1A illustrates an effect of irradiance on a solar cell's current at a temperature of 25° C. As an amount of sunlight incident on the surface of the solar panel is reduced, the current capability of the solar panel decreases. In FIG. 1A, a first curve 105 illustrates the solar cell's I-V curve when the solar panel receives 1 kW/m² (or 0.1 W/cm²). The solar cell here generates approximately 5.5 A at 0.1V. At approximately 0.35V, the current starts to drop, and the current drops to 0 A at approximately 0.59V. A second curve 110 illustrates the solar cell's I-V curve when the solar panel receives 0.75 kW/m². The solar cell here generates approximately 4 A at 0.1V. At approximately 0.35V, the current starts to drop and is 0 A at approximately 0.580 V. A third curve 115 illustrates the solar cell's I-V curve when the solar panel receives 0.5 kW/m². The solar cell here generates approximately 2.8 A at 0.1V. At approximately 0.35V, the current starts to drop and is 0 A at approximately 0.570V.

FIG. 1B illustrates an effect of temperature on a solar cell's voltage at an irradiance of 1 kW/m². As stated above, the ideal solar cell can be modeled as a current source in parallel with a diode. At a constant irradiance, a diode drop varies with temperature. Accordingly, the solar cell follows a temperature behavior of a PN diode. As a temperature of the solar cell increases, the output voltage of the solar cell decreases. In FIG. 1B, a first curve 120 illustrates the solar cell's I-V curve at a temperature of 0° C. A second curve 125 illustrates the solar cell's I-V curve at a temperature of 25° C. A third curve 130 illustrates the solar cell's I-V curve at a temperature of 60° C. In each case, the solar cell generates approximately 5.5 A at 0.1V. When operating at a temperature of 0° C., the current starts to drop at approximately 0.4V and drops to 0 A at approximately 0.63V. When operating at a temperature of 25° C., the current starts to drop at approximately 0.35V and drops to 0 A at approximately 0.59V. When operating at a temperature of 60° C., the current starts to drop at approximately 0.25V and drops to 0 A at approximately 0.5V. Further, the knee of the I-V curve of the solar cell varies with temperature as indicated above.

Accordingly, as the solar panel is blocked from sunlight or when the solar panel experiences high temperatures, the solar panel's output current and output voltage can be affected. If the solar panel is used to charge a battery, the battery may not receive an adequate charge when the temperature exceeds a certain value because the current delivered may be below a threshold current needed to charge the battery. This becomes an issue when the solar panel is used, for example, to charge the lead-acid battery of a vehicle.

Figure 2:
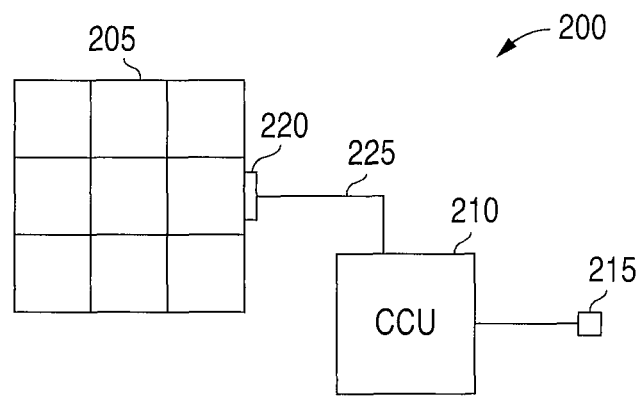
FIG. 2 illustrates an example solar-powered battery charging system according to this disclosure.

FIG. 2 illustrates an example solar-powered battery charging system 200 according to this disclosure. In this example, the system 200 includes at least one solar panel 205. If multiple solar panels 205 are used, the solar panels 205 could be coupled together in series and/or in parallel. Each solar panel 205 includes any suitable structure for receiving solar energy and generating electrical energy.

The solar panel 205 is coupled to a conversion control unit (CCU) 210. The CCU 210 receives electrical energy generated by the solar panel 205. The CCU 210 also maintains a charging voltage and a charging current provided to a load within specified ranges. For example, the CCU 210 can perform temperature compensation, voltage boosting and bucking, and auto-restart of the system 200. The CCU 210 includes any suitable structure for regulating a charging voltage and a charging current. For example, the CCU 210 could include a buck/boost converter for performing boost and buck operations on the received electrical energy.

The CCU 210 can be coupled to an electrical load through a terminal 215. For example, the terminal 215 could include multiple leads, such as a positive lead for coupling to a positive terminal of a battery and a negative lead for coupling to a negative terminal of the battery. The terminal 215 includes any suitable structure for coupling to a load. In particular embodiments, the terminal 215 can be configured to be coupled to a data port (such as an automobile two-way on-board diagnostic connector port), an electrical outlet, a vehicle cigarette lighter, or other interface.

The system 200 further includes a temperature sensor 220. The temperature sensor 220 can be coupled to the solar panel 205, such as mounted on a back surface of the solar panel 205. The temperature sensor 220 includes any suitable structure for measuring temperature.

In this example, the CCU 210 is coupled to the solar panel 205 and the temperature sensor 220 through a data/power line 225. The data/power line 225 can carry data, such as temperature measurements, from the temperature sensor 220 to the CCU 210. The data/power line 225 can also carry electrical energy generated by the solar panel 205 to the CCU 210. In some embodiments, the data/power line 225 includes one or more first lines for carrying data and one or more second lines for carrying electrical energy. In other embodiments, the line 225 includes one or more lines for carrying electrical energy, and the temperature sensor 220 and the CCU 210 communicate wirelessly (such as by using infrared, radio frequency, optical, or other links).

The CCU 210 receives temperature measurements from the temperature sensor 220. As the temperature increases or decreases, the CCU 210 can either boost or buck the voltage generated by the solar panel 205 to maintain the solar panel's voltage within a specified voltage range. The CCU 210 can also restart a charge process if the solar panel 205 experiences an interruption in sunlight, such as by a foreign object shading the solar panel 205.

In some embodiments, the system 200 is configured to charge a battery of a vehicle. The vehicle battery can be any storage device that stores energy for use in a vehicle, such as a lead acid battery, a lithium ion battery, or a nickel metal hydride battery. The system 200 can be coupled to the vehicle battery for a period of time in order to charge the vehicle battery or maintain the charge on the vehicle battery. For example, the system 200 can be mounted temporarily inside a vehicle that is in storage. When a vehicle is left in storage for a prolonged period of time, the battery can experience a significant drop in stored energy, meaning the stored charge in the battery dissipates. The system 200 can be placed in, on, or near the vehicle to provide a charge to the battery.

As a particular example, the solar panel 205 can be placed in a location within the vehicle where the solar panel 205 will experience prolonged sunlight, such as by attaching the solar panel 205 to a windshield, sunroof, hood, or roof of the vehicle. The CCU 210 can be placed inside the vehicle, and the terminal 215 can be coupled to the on-board diagnostic connector port of the vehicle. The solar panel 205 generates and provides electrical energy to the CCU 210 while the solar panel 205 receives sunlight. The CCU 210 regulates the voltage and current to be within specified charging parameters for the battery in the vehicle, such as parameters for a lead acid battery. The CCU 210 provides the electrical energy to the vehicle battery through the terminal 215 and the on-board diagnostic connector port.

In particular embodiments, the CCU 210 can deliver a substantially constant current over a relatively wide voltage range, such as 75 mA/hr over 10.8V-14.4V. Also, the CCU 210 can regulate the supplied current and voltage to remain within the voltage range and at the substantially constant current level as the solar panel's temperature varies over a wide temperature range, such as from 0° C. to 100° C.

Figure 3:
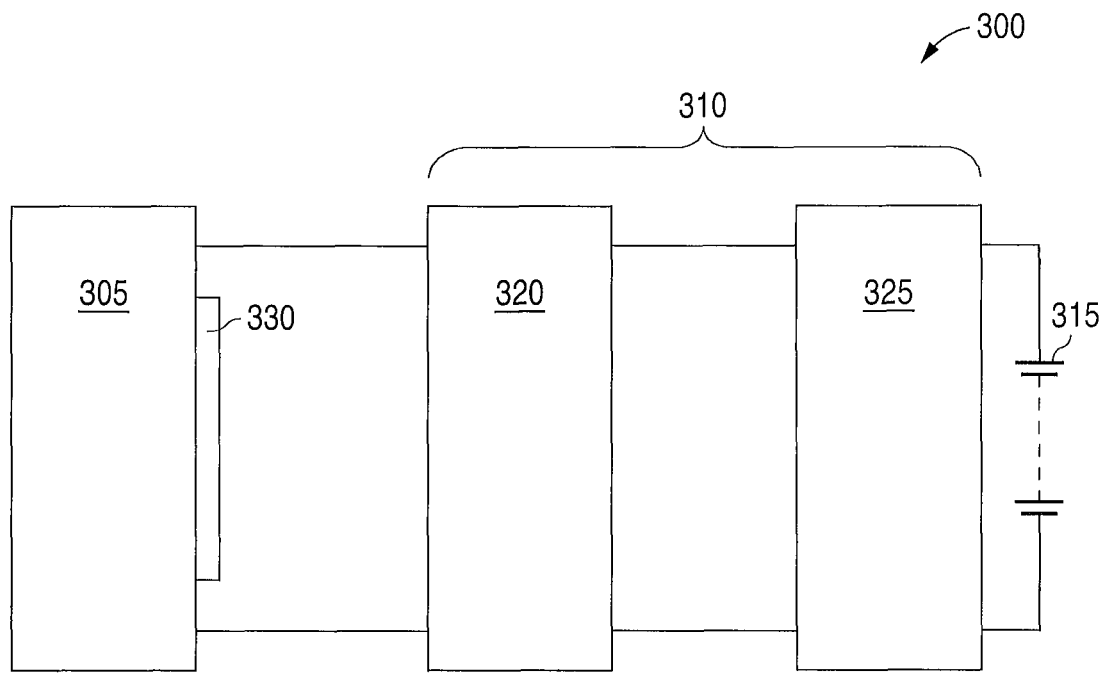
FIG. 3 illustrates an example multi-stage solar-powered battery charging system according to this disclosure.

FIG. 3 illustrates an example multi-stage solar-powered battery charging system 300 according to this disclosure. As shown in FIG. 3, the system 300 includes at least one solar panel 305 coupled to a multi-stage converter 310. In some embodiments, the solar panel 305 is detachably coupled to the multi-stage converter 310. For example, the multi-stage converter 310 could be configured so that different solar panels 305 having different sizes or other characteristics can be used in the system 300. In particular embodiments, the solar panel 305 includes an 18-cell 3 W solar panel.

The system 300 is also coupled (possibly detachably) to a battery bank 315, which includes one or more batteries. For example, the system 300 can be coupled to the battery bank 315 by terminals adapted be to be coupled to positive and negative terminals on the battery bank 315. In some embodiments, the terminals also include a data terminal adapted to receive charge status data from the battery bank 315. In other embodiments, the system 300 is coupled to the battery bank 315 via an on-board diagnostic connector of a vehicle.

The multi-stage converter 310 includes multiple stages, such as a first stage 320 and a second stage 325 (also referred to as a "boost stage"). The first stage 320 could monitor the solar panel's voltage and provide an output voltage that tracks the solar panel's voltage over a temperature range. The first stage 320 could also receive temperature measurements of the solar panel 305 from a temperature sensor 330 attached to or otherwise associated with the solar panel 305.

Additionally, the first stage 320 can detect that the solar panel 305 has been shaded and restart the system 300 once the shading has been removed. The first stage 320 can detect shading in any suitable manner, such as by detecting a reduction in the current or voltage supplied by the solar panel 305. A significant reduction in the current or voltage can occur when the solar panel 305 is shaded, and this can cause an overload condition in the system 300. The first stage 320 can monitor its input voltage or current and determine when the input voltage or current has fallen below a threshold value for a period of time. The first stage 320 can determine that the solar panel has been shaded and shut down (or place in a sleep mode) portions of the system 300 to prevent an overload condition. The first stage 320 can then restart the portions of the system 300 upon detecting a voltage or current from the solar panel 305 indicating that the shading has been removed.

In some embodiments, the first stage 320 includes a controller or other processing circuitry that monitors the solar panel's voltage and the temperature of the solar panel 305. The controller also performs shade detection, restarts the system 300, and regulates an output voltage generated by the first stage 320. For example, the controller can be a LM5001 controller from NATIONAL SEMICONDUCTOR CORP. In particular embodiments, the first stage 320 can include a Single Ended Primary Inductor Converter (SEPIC), which is a DC-DC converter that allows an output voltage to be greater than, less than, or equal to an input voltage. The SEPIC provides an output voltage that is of the same polarity as the input voltage and can control a duty cycle of a control transistor to control the output voltage.

The second stage 325 boosts or bucks the output voltage from the first stage 320 over a temperature range. For example, the second stage 325 receives the output voltage from the first stage 320 and performs a second voltage and temperature compensation by boosting or bucking the voltage to be within a specified voltage range. The second stage 325 also includes a multi-stage constant current control that charges the battery bank 315 at a constant current over a period of time.

As a particular example, the first stage 320 can receive an output voltage from the solar panel 305 that varies from 9V at 25° C. to 6V at 100° C. The first stage 320 can output a voltage from 9V at 25° C. to 4.5V at 100° C. The system 300 can be configured to provide dual-stage current regulation to provide an optimum current under various temperature conditions.

The system 300 can also be configured to provide overvoltage protection to prevent a boost output (an output during boosting) from entering into an over-voltage condition, thus protecting the battery bank 315. For example, an output of a boost stage of the system 300 can be clamped to a fixed output value in the event that a reference, such as a temperature reference, is lost. The over-voltage protection circuit is configured to prevent the output voltage from exceeding a specified amount. The system 300 can further be configured to provide short-circuit protection, again protecting the battery bank 315.

FIGS. 4A through 4D illustrate example first stages 320 of a multi-stage solar-powered battery charging system 300 according to this disclosure. In this example, the first stage 320 is a DC-DC converter, namely a SEPIC, that provides a first output voltage 405 that is greater than, less than, or equal to an input voltage 410. The first stage 320 can provide the first output voltage 405 that is of the same polarity as the input voltage 410. The first stage 320 includes a control transistor 415. A duty cycle of the control transistor 415 is varied to control the first output voltage 405.

When in a continuous mode of operation (a current through an inductor 420 is non-zero), an average voltage across a capacitor 425 equals the input voltage 410. The capacitor 425 blocks DC current, so an average current through the capacitor 425 is zero. As a result, an average current through an inductor 430 is the average load current and is independent of the input current. In other embodiments, the inductor 430 can be replaced with a transformer to provide an isolated version of the first stage 320.

Figure 4A:
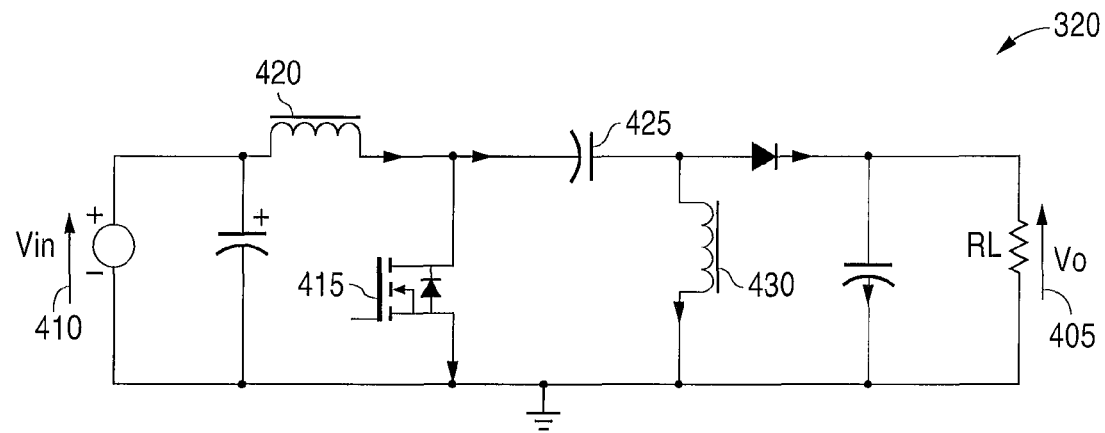
FIGS. 4A through 4D illustrate example first stages of a multi-stage solar-powered battery charging system according to this disclosure.
Figure 4B:
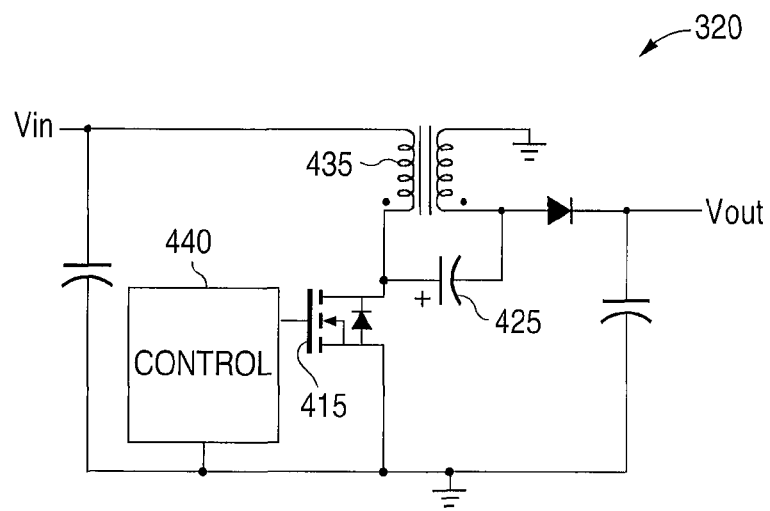

In still other embodiments, the inductors 420 and 430 can be replaced by a transformer 435 having a 1:1 ratio as shown in FIG. 4B. When the transistor 415 is turned on, such as under the control of a controller 440, a positive terminal of the capacitor 425 is tied to ground. The transformer 435 operates so that a voltage across the capacitor 425 equals the input voltage. The first stage 320 can provide an output voltage expressed as:

$$\frac{V_o}{V_{in}} = \frac{D}{1-D} \quad (1)$$

where D corresponds to the duty cycle of the transistor 415.

Figure 4C:
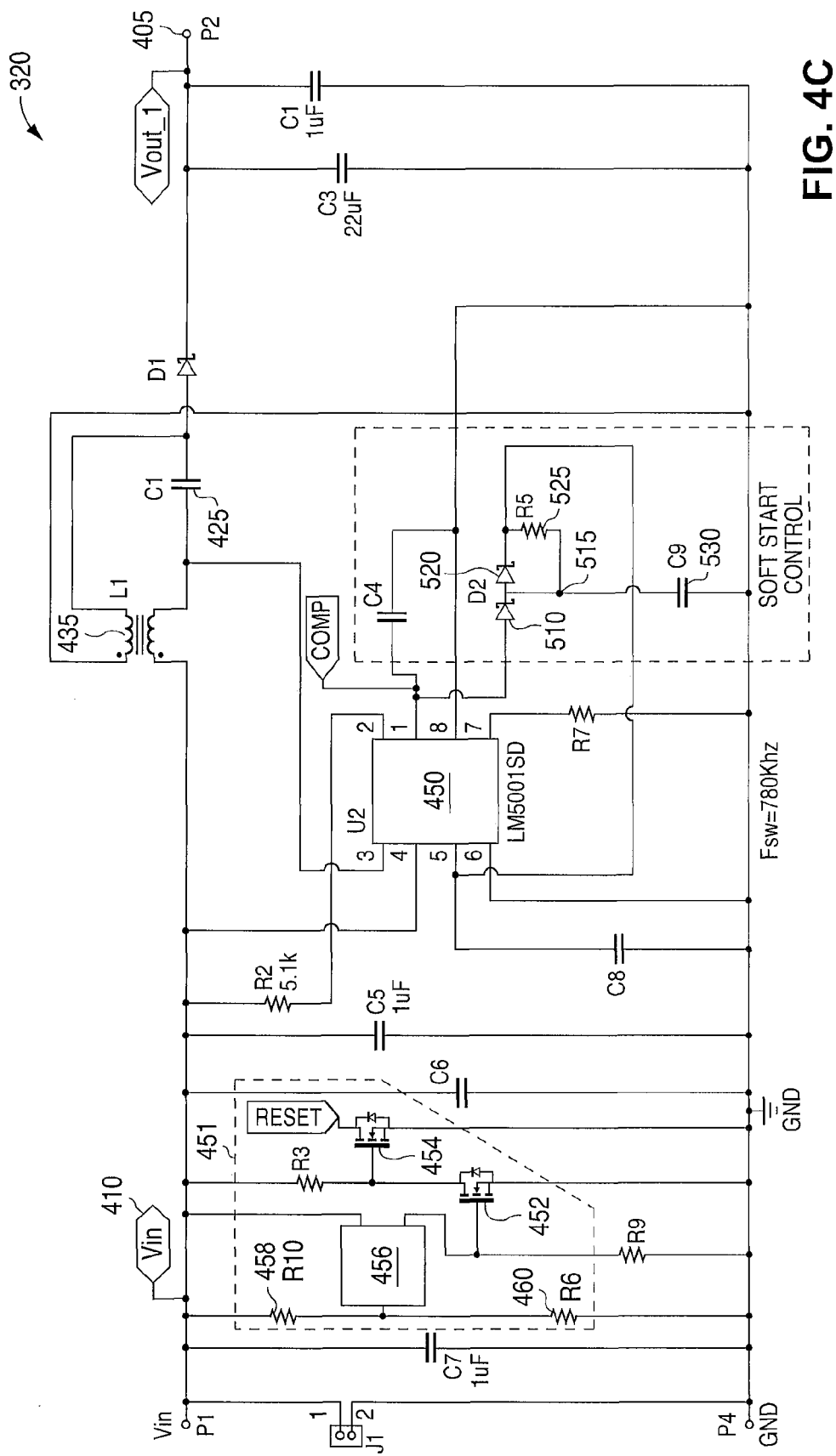

As shown in FIG. 4C, the controller 440 and the transistor 415 can be included in a high-voltage switch mode regulator 450. An example regulator 450 is the LM5001 from NATIONAL SEMICONDUCTOR CORP. FIG. 4C illustrates an example embodiment of the first stage 320 including the high voltage switch mode regulator 450.

Figure 4D:
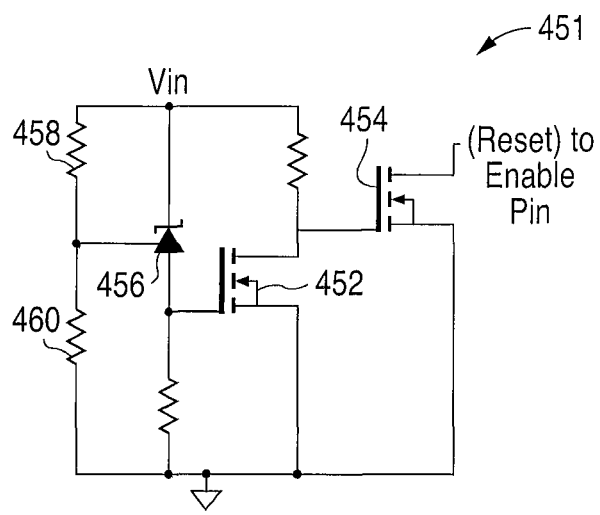

The first stage 320 in FIG. 4C also includes a shading circuit 451, which is also shown in FIG. 4D. The shading circuit 451 restarts the multi-stage converter 310 after shading has been removed from the solar panel 305. The shading circuit 451 here includes switches 452-454 that disable at least a portion of the second stage 325. The shading circuit 451 also includes a voltage reference circuit 456, such as an LM4041 from NATIONAL SEMICONDUCTOR CORP. The voltage reference circuit 456 is coupled to a voltage divider that includes resistors 458-460. The voltage reference circuit 456 detects a drop in the solar panel's voltage via the voltage divider. In response to determining that the solar panel's voltage has dropped below a threshold value, the shading circuit 451 initiates a restart by disabling a portion of the second stage 325 through a signal transmitted from the switches 452-454 to a controller in the second stage 325. For example, the switch 454 can transmit a signal to pull-down an enable pin in the second stage controller to disable the second stage 325. When the voltage of the solar panel increases indicating that the fault condition (the shading) has been removed, the shading circuit 451 enables the second stage 325 to operate. For example, the switch 454 can discontinue the signal that pulls-down the enable pin in the second stage controller to enable the second stage 325.

Figure 5A:
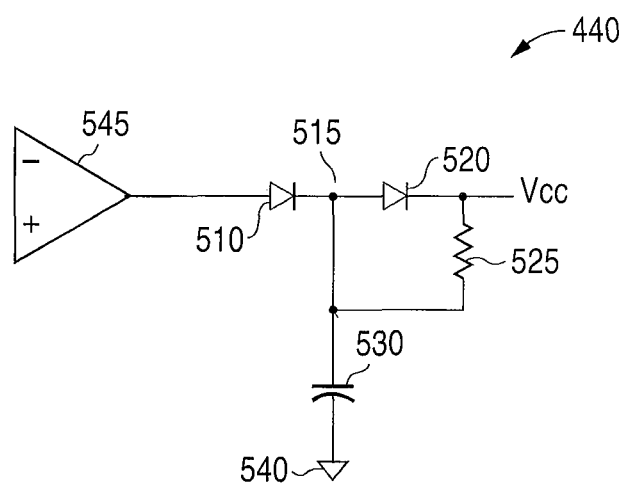
FIGS. 5A through 5C illustrate example controllers in a multi-stage solar-powered battery charging system according to this disclosure.
Figure 5B:
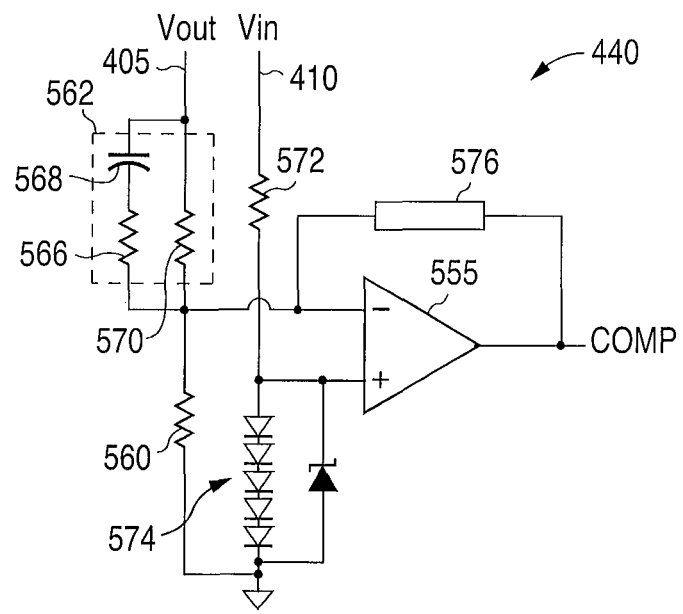
Figure 5C:
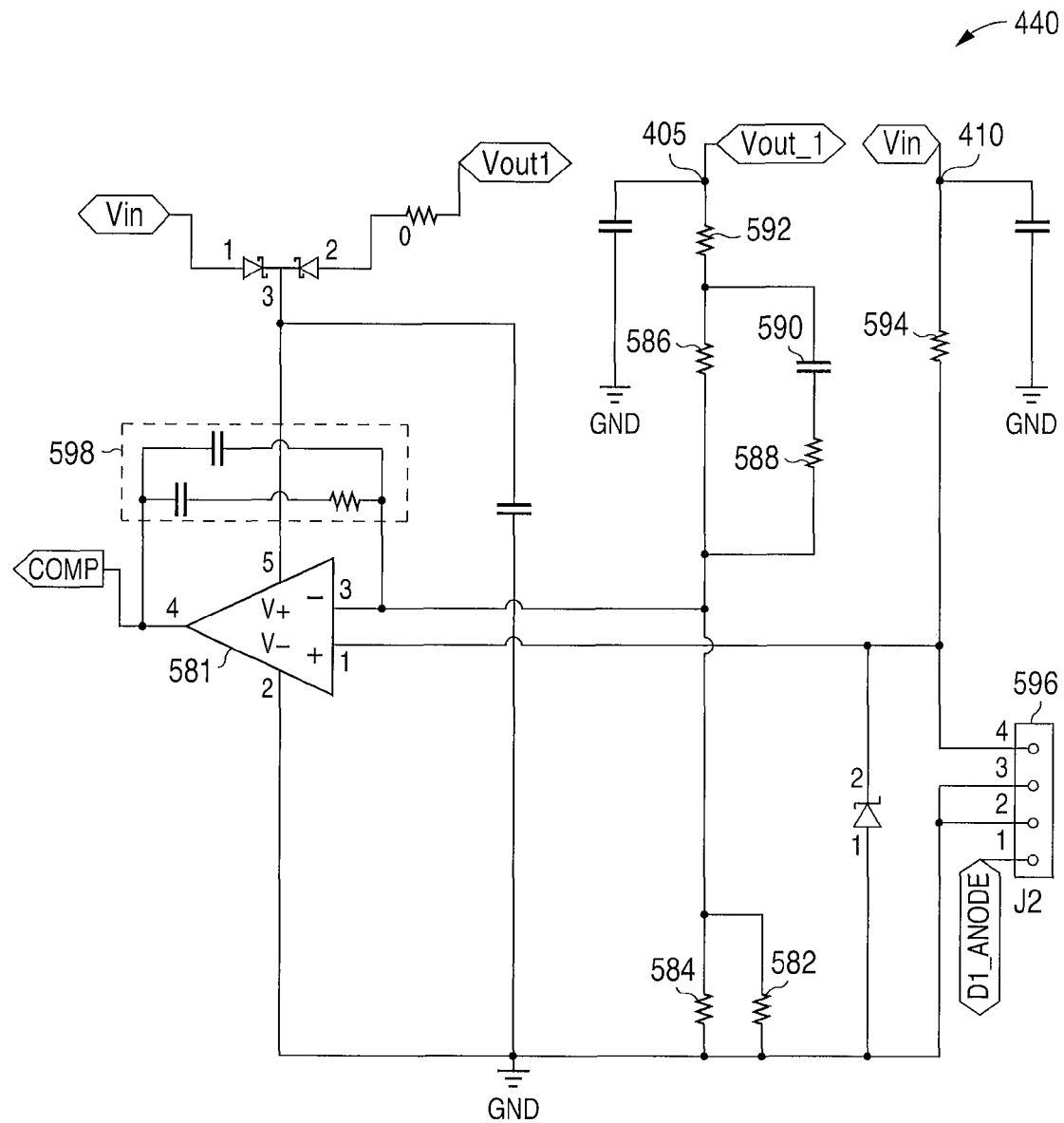

FIGS. 5A through 5C illustrate example controllers 440 in a multi-stage solar-powered battery charging system 300 according to this disclosure. In FIG. 5A, the controller 440 includes a soft start circuit. For example, when the high-voltage switch-mode regulator 450 is implemented using an LM5001 operating at 780 kHz, an internal soft start based on the frequency may be limited. Therefore, the soft start circuit shown in FIG. 5A is configured to extend a soft start time to ensure that the solar panel is not overloaded during turn-on. The soft start circuit can include a diode-resistive-capacitor (DRC) network coupled between a bias regulator output $V_{CC}$ and a loop compensation terminal COMP of a high-voltage switch-mode regulator 450 (illustrated on FIGS. 4C and 5A). The soft start circuit here includes a first diode 510 coupled to, for example, an amplifier 545 included in the regulator 450 and to a first node 515. A second diode 520 is coupled to the first node 515 and to a resistor 525. A capacitor 530 is coupled between the first node 515 and ground 540.

As shown in FIG. 5B, the controller 440 in the first stage 320 can also include a voltage adjust point circuit to accommodate for different solar panel voltages. The voltage adjust point circuit here includes a voltage divider coupled to an inverting input of an operational amplifier (op-amp) 555. The voltage divider here includes a first resistor 560 coupled between the inverting input of the op-amp 555 and ground. The voltage divider also includes an input impedance circuit 562 coupled between the inverting input of the op-amp 555 and the output voltage 405. The input impedance circuit 562 can include a resistor 566 and a capacitor 568 coupled in parallel with a resistor 570.

A non-inverting input of the op-amp 555 is coupled to the input voltage 410 through a resistor 572. The non-inverting input is also coupled to a thermal sensor 574. A feedback impedance circuit 576 is coupled from an output of the op-amp 555 to the inverting input of the op-amp 555. The output of the op-amp 555 is also coupled to the COMP terminal of the regulator 450.

A voltage setpoint can be adjusted by adjusting the voltage divider. For example, the voltage divider can be adjusted by changing the resistances of the resistors 560 and 570 to match a reference voltage established by the thermal sensor 574. In some embodiments, since a reference voltage generated by a string of diodes can vary with temperature, the thermal sensor 574 can include multiple diodes coupled together and configured as the temperature sensor attached to the solar panel 305. As a particular example, the reference voltage can be generated from the thermal reference board 574, such as for example 1.34V at 25° C.

As shown in FIG. 5C, the controller 440 in the first stage 320 can also include a voltage adjust point circuit to accommodate for different solar panel voltages. The voltage adjust point circuit can include a voltage divider coupled to an inverting input of an op-amp 581. The voltage divider includes a first resistor pair coupled between the inverting input of the op-amp 581 and ground and an input impedance circuit coupled between the inverting input of the op-amp 581 and the first output voltage 405. The first resistor pair includes resistors 582-584 coupled in parallel. The impedance circuit includes a resistor 586 coupled in parallel with a resistor 588 and a capacitor 590. In some embodiments, the voltage adjust point circuit also includes a resistor 592 coupled between the output voltage 405 and the impedance circuit.

A non-inverting input of the op-amp 581 is coupled to the input voltage 410 through a resistor 594. The non-inverting input is also coupled to a thermal sensor board 596. A feedback impedance circuit 598 is coupled from an output of the op-amp 581 to the inverting input of the op-amp 581. The output of the op-amp 581 is also coupled to the COMP terminal of the regulator 450 (shown in FIG. 4C).

A voltage setpoint can be adjusted by adjusting the voltage divider. For example, the voltage divider can be adjusted by changing the resistances of the resistors 582-586 to match a reference voltage established by the thermal sensor board 596. The thermal sensor board 596 can be coupled to the temperature sensor attached to the solar panel 305 and can generate a voltage corresponding to a temperature of the solar panel 305. The reference voltage generated by the thermal sensor board 596 can vary with temperature changes on the solar panel 305. For example, the reference voltage can be generated from the thermal reference board 596, such as 1.34V at 25° C.

Figure 6B:
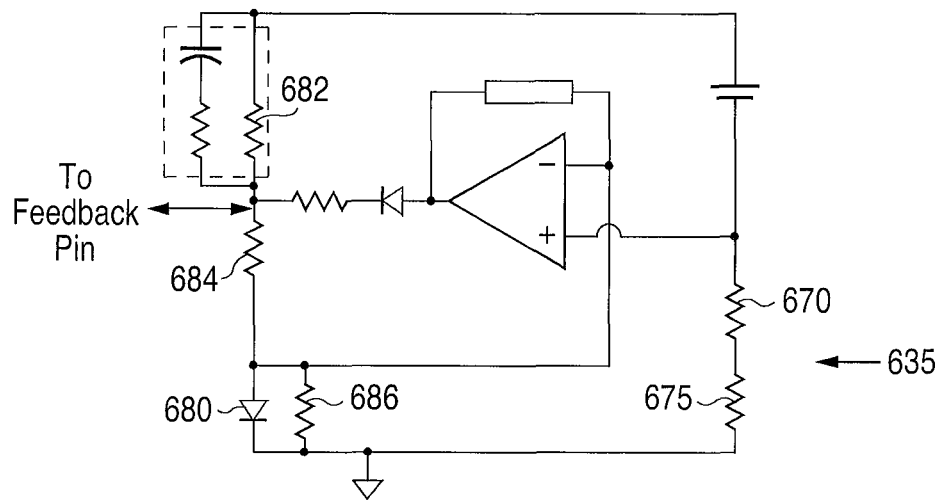
FIGS. 6A through 6B illustrate example second stages of a multi-stage solar-powered battery charging system according to this disclosure.
Figure 6A:
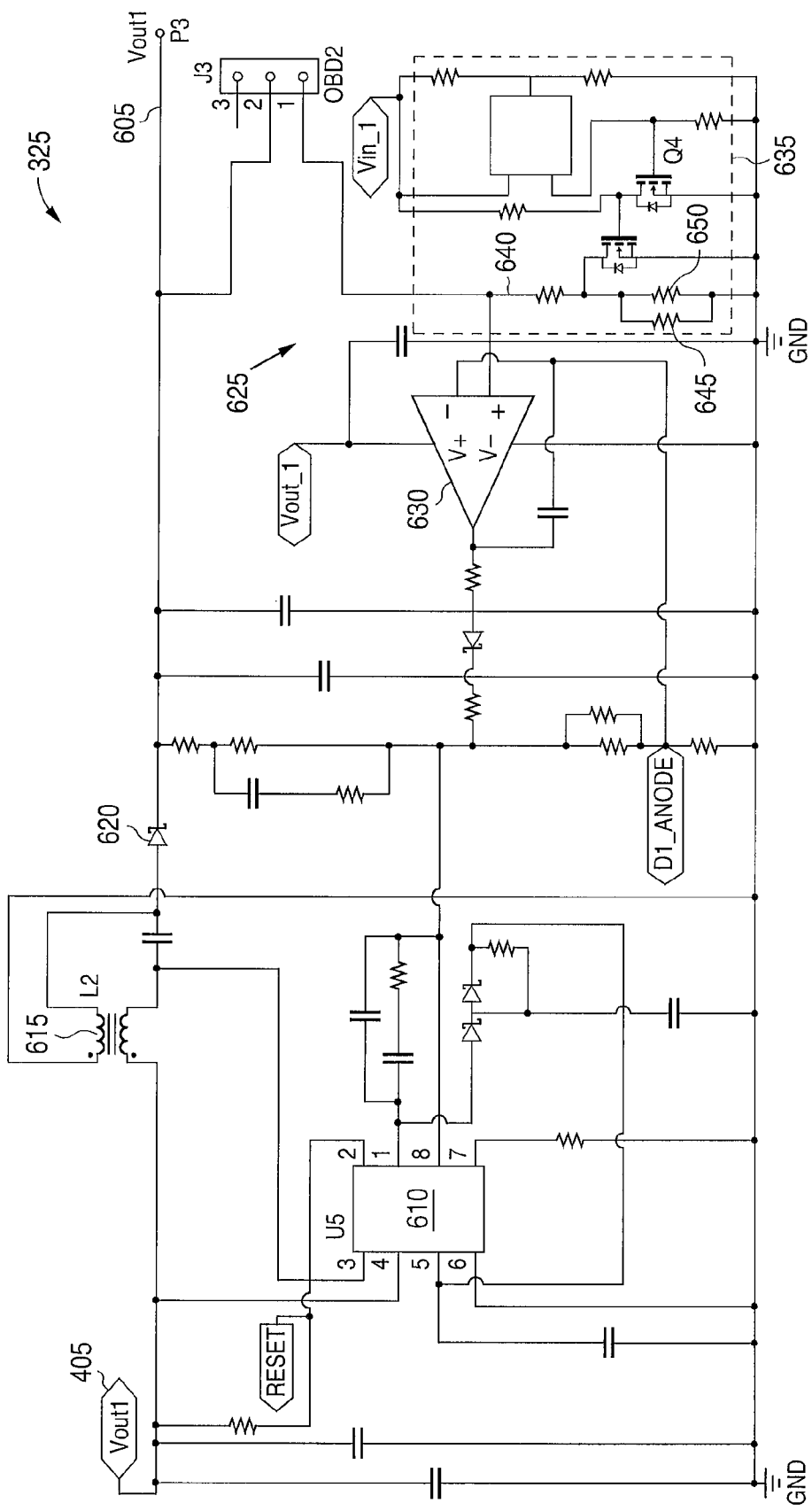

FIGS. 6A through 6B illustrate example second stages 325 of a multi-stage solar-powered battery charging system 300 according to this disclosure. As shown in FIG. 6A, the second stage 325 is configured to receive the first output voltage 405 from the first stage 320 and to provide a second output voltage 605 to an electrical load, such as a battery. Note that the second stage 325 in FIG. 6A could receive an input voltage from any suitable first stage, such as any of the first stages shown in FIGS. 4A-4C.

The second stage 325 in FIG. 6A includes a controller 610. The controller 610 can, for example, represent a high-voltage switch-mode regulator, such as an LM5001 from NATIONAL SEMICONDUCTOR CORP. The controller 610 is coupled through one terminal to the first output voltage 405 and through a second terminal to ground. The controller 610 here includes an enable pin coupled to a reset signal generator, such as the switch 454 illustrated in FIGS. 4C and 4D.

The second stage 325 also includes a transformer 615 (or coupled inductor) coupled on its primary side between the first output voltage 405 and the controller 610. The transformer 615 is coupled on its secondary side to ground and to the second output voltage 605 via a Schottky diode 620. The second stage 325 can be a SEPIC converter configured to operate in a boost mode. The second stage also can be a boost converter.

The second stage 325 further includes a constant current control unit 625. The constant current control unit 625 includes an op-amp 630 coupled to a feedback pin of the controller 610. The op-amp 630 has an inverting input coupled to a temperature sensing unit, a thermal sensor (such as sensor 680), or a thermal sensor board (such as board 596). The op-amp 630 also has a non-inverting input coupled between a negative terminal of the electrical load and a resistor network 635. The resistor network 635 includes switches coupled between resistors 640-650 such that a resistive value of the resistor network 635 is configured to provide a constant current charge to the battery bank 315. The constant current charge can be varied in response to changes in the solar panel's temperature and voltage.

The constant current control unit 625 is configured to provide feedback to the controller 610 based on the solar panel's voltage and the temperature of the solar panel 305. As the voltage of the solar panel 305 drops and/or the temperature varies, the controller 610 maintains a constant current charge to the battery bank 315. The second stage 325 voltage can be set by resistors 682 and 684 and a parallel combination of sensor 680 and resistor 686. Sensor 680 detects variations in the solar panel 305 temperature. These variations affect a boost voltage set point if the battery bank 315 is not connected to the output terminals.

In some embodiments, such as the one shown in FIG. 6B, the resistor network 635 includes resistors 670-675. Adjusting the resistances of the resistors 670-675 changes the current provided to the electrical load. The current can be set as follows:

$$I = \frac{V_{d1}}{R_{CA1} + R_{CA2}} \quad (2)$$

where I denotes the current, $V_{d1}$ denotes the reference voltage forward drop of diode Vd1 (680), and $R_{CA1}$ and $R_{CA2}$ denote the resistances of the resistors 670-675. Since the voltage $V_{d1}$ generated by the thermal sensor board 596 varies with temperature, the second stage 325 can perform temperature compensation.

The second stage 325 can also be configured to provide over-voltage protection to prevent a boost output from entering an over-voltage condition, thus protecting the battery bank 315. For example, an output of the second stage 325 can be clamped to a fixed output value in the event that a reference, such as a temperature reference, is lost. The over-voltage protection circuit is therefore configured to prevent the output voltage 605 from exceeding a specified amount. For example, if the thermal sensor board 596 fails or is accidentally disconnected, a maximum boost voltage can be determined as:

$$V_{boostclamp} = \frac{R_0 + R_{tb} + R_{bb}}{R_{tb} + R_{bb}} V_{ref} \quad (3)$$

where $R_{tb}$ denotes the resistance of the resistor 682, $R_{bb}$ denotes the resistance of the resistor 684, Ro denotes the resistance of the resistor 686 and $V_{ref}$ denotes a reference voltage for the controller 610. In one particular embodiment, $V_{ref}$ for the LM5001 is 1.26V nominally.

Figure 7:
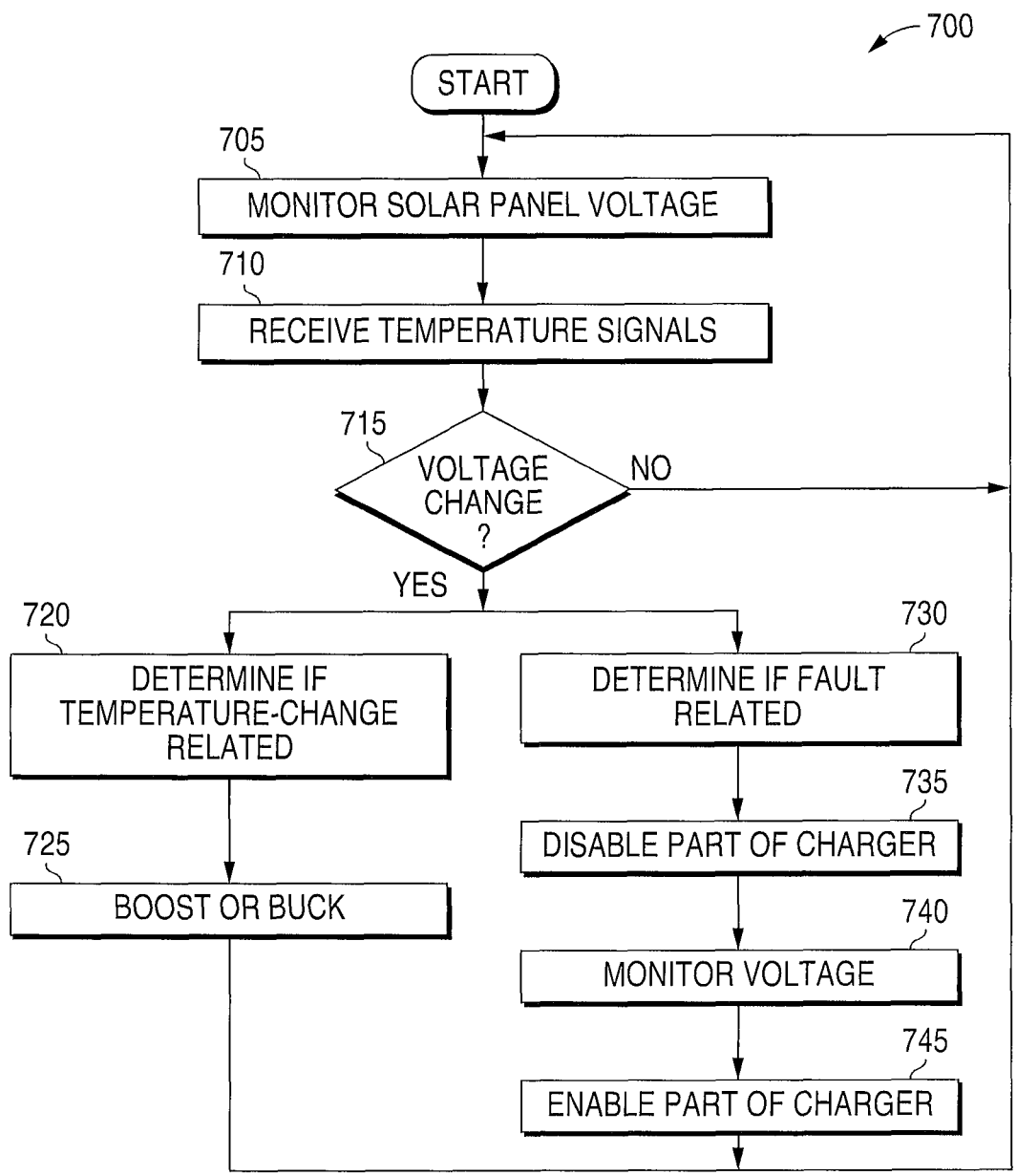
FIG. 7 illustrates an example solar-powered battery charging process according to this disclosure.

FIG. 7 illustrates an example solar-powered battery charging process 700 according to this disclosure. At step 705, a charger monitors a voltage of a solar panel. The charger can monitor the solar panel's voltage substantially continuously, or the charger can monitor the solar panel's voltage at specified periods of time.

At step 710, the charger receives temperature signals corresponding to a temperature of the solar panel. For example, the temperature signals can represent voltages corresponding to the solar panel's temperatures, or the temperature signals can represent data messages configured to convey the temperatures of the solar panel.

The charger determines whether a change in the solar panel's voltage occurs at step 715. If the charger determines that the solar panel's voltage has not changed, the charger returns to step 705 to continue monitoring the voltage.

If the charger determines that the solar panel's voltage has changed, the charger determines if the voltage change is related to a temperature change at step 720. If so, the charger performs boost or buck operations to compensate for the change in the solar panel's voltage at step 725. For example, the charger can boost the voltage if the solar panel's voltage has decreased as the solar panel's temperature increased. The charger then returns to step 705.

If the charger determines that the solar panel's voltage has changed, the charger also determines if the voltage change is related to a fault (such as shading) at step 730. This could occur only if the change in the solar panel's voltage is a drop in voltage, such as a drop to 0V or to a voltage below some threshold. If so, the charger disables a portion of the charger at step 735, such as by disabling a second stage of the charger. The charger monitors the solar panel's voltage at step 740. When the solar panel's voltage rises to a specified level (such as a non-zero value or a value above the threshold), the charger enables the disabled portions of the charger at step 745 and returns to step 705.

In this way, the charger monitors the output voltage of the charger and/or the output current of the charger. The charger can adjust the output voltage of the charger to maintain the output voltage in a specified range. The charger can also adjust the output current, such as by varying a resistance of a portion of the charger, to maintain an output current in a specified range.

While the figures described above illustrate various examples of charging systems and method for charging batteries, various changes may be made to these figures. For example, the functional divisions shown in FIGS. 1A through 6B are for illustration only. Various components in FIGS. 1A through 6B could be omitted, combined, or further subdivided and additional components could be added according to particular needs. Also, each component in FIGS. 1A through 6B could be implemented using any suitable structure(s). Further, additional components could be added to FIGS. 1A through 6B to provide any desired additional functionality. Although FIG. 7 illustrates various steps performed in series and in parallel, various other steps in FIG. 7 could occur in parallel or in series, occur multiple times, or occur in a different order.

It may be advantageous to set forth definitions of certain words and phrases that have been used within this patent document. The term "couple" and its derivatives refer to any direct or indirect electrical connection between two or more components, whether or not those components are in physical contact with one another. The phrases "turned on" and "switched on" are synonymous for an electrically conducting state, and the terms "turned off" and "switched off" are synonymous for an electrically non-conducting state. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A solar-powered charger comprising:
    a solar panel configured to generate electrical energy at a first voltage level that varies with temperature; and
    a two-stage converter configured to receive the electrical energy from the solar panel, perform temperature compensation, and output the electrical energy to a load at a second voltage level, including
        a first converter stage responsive to the first voltage level to output electrical energy at an intermediate voltage level, the intermediate voltage level being adjusted in accordance with a first reference voltage corresponding to a temperature associated with the solar panel; and
        a second converter stage responsive to the intermediate voltage level to output to the load a substantially constant current at the second voltage level, the substantially constant current being adjusted in accordance with a second reference voltage corresponding to the temperature associated with the solar panel.

2. The charger of claim 1, further comprising:
    a restart circuit configured to disable at least a portion of the charger in response to a fault and to restart at least the portion of the charger after the fault has been removed.

3. The charger of claim 1, further comprising:
    an over-voltage circuit configured to prevent the second voltage level from exceeding a specified amount.

4. The charger of claim 1, wherein the second voltage level is in a range between 13.2V and 14.4V.

5. The charger of claim 1, wherein the converter is configured to output the electrical energy at the second voltage level with a substantially constant current over temperatures in a range between 0° C. and 100° C.

6. The charger of claim 1, wherein the converter is configured to be coupled to at least one of: a lead acid battery, a lithium ion battery, and a nickel metal hydride battery.

7. The charger of claim 1, wherein the converter is configured to be coupled to and recharge a battery via an on-board diagnostic connector port in a vehicle.

8. An electrical charging unit comprising:
- an input terminal configured to be coupled to receive electrical energy from a solar panel configured to generate electrical energy at a first voltage level that varies with temperature;
- an output terminal configured to be coupled to a load; and
- a two-stage converter configured to receive the electrical energy from the input terminal, perform temperature compensation, and output the electrical energy to the load via the output terminal, including:
- a first converter stage responsive to the first voltage level to output electrical energy at an intermediate voltage level, the intermediate voltage level being adjusted in accordance with a first reference voltage corresponding to a temperature associated with the solar panel; and
- a second converter stage responsive to the intermediate voltage level to output a substantially constant current at a second voltage level, the substantially constant current being adjusted in accordance with a second reference voltage corresponding to the temperature associated with the solar panel.

9. The electrical charging unit of claim 8, further comprising: a restart circuit configured to disable the second stage in response to a fault and to restart the second stage after the fault has been removed.

10. The electrical charging unit of claim 8, further comprising:
- an over-voltage circuit configured to prevent the electrical energy output to the load from exceeding a specified energy level.

11. The electrical charging unit of claim 8, wherein the converter is configured to output the electrical energy at a voltage in a range between 13.2V and 14.4V.

12. The electrical charging unit of claim 11, wherein the converter is configured to output the electrical energy at a substantially constant current over temperatures in a range between 0° C. and 100° C.

13. The method of claim 8, further comprising:
- preventing the electrical energy output to the load from exceeding a specified energy level.

14. A method comprising:
- generating electrical energy using a solar panel at a first voltage that varies with temperature;
- measuring a temperature of the solar panel and providing both a first reference voltage and a second reference voltage corresponding to the measured temperature;
- outputting from a first stage, in response to the first voltage level, electrical energy at an intermediate voltage level, the intermediate voltage level being adjusted in accordance with the first reference voltage; and
- outputting from a second stage, in response to the intermediate voltage level, electrical energy as a substantially constant current at a second voltage level, the substantially constant current being adjusted in accordance with the second reference voltage.

15. The method of claim 14, further comprising:
- determining if a fault condition has occurred; and
- in response to the fault condition, disabling the output of the electrical energy from the second stage.

* * * * *